United States Patent
Jacobsen et al.

(10) Patent No.: US 8,005,886 B2
(45) Date of Patent: Aug. 23, 2011

(54) SYSTEMS AND METHODS FOR GENERATING NETWORK MESSAGES

(75) Inventors: Paul G. Jacobsen, Los Angeles, CA (US); Scott A. Guillaudeu, Santa Clara, CA (US); David R. Freeman, Milpitas, CA (US); Sridhar Krishnamurthy, Santa Clara, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1100 days.

(21) Appl. No.: 11/419,362

(22) Filed: May 19, 2006

(65) Prior Publication Data

US 2006/0267798 A1    Nov. 30, 2006

Related U.S. Application Data

(60) Provisional application No. 60/683,402, filed on May 19, 2005.

(51) Int. Cl.
*G06F 15/16* (2006.01)
(52) U.S. Cl. .................................................. 709/200
(58) Field of Classification Search ................... 709/200
See application file for complete search history.

(56) References Cited

U.S. PATENT DOCUMENTS

| 7,404,013 | B1 * | 7/2008 | Masiewicz .................. 710/5 |
| 2004/0174570 | A1 * | 9/2004 | Plunkett et al. ............. 358/3.13 |
| 2005/0138154 | A1 * | 6/2005 | Seto ............................ 709/223 |

OTHER PUBLICATIONS

*Serial ATA: High Speed Serialized AT Attachment, Revision 1.0*; Dated Aug. 29, 2001; 307 pages.
*PacketMaker User's Manual, 1.0 Release*; Dated Dec. 19, 2002; 18 pages.
*PacketMaker™ II Wide Port SAS 1.5 Gb/sec User's Manual*; Dated Sep. 7, 2004; 177 pages.

* cited by examiner

*Primary Examiner* — Wing F Chan
*Assistant Examiner* — Andrew Woo
(74) *Attorney, Agent, or Firm* — Matthew A. Pequignot; Pequignot + Myers LLC

(57) ABSTRACT

A networking system may include a traffic generator. The traffic generator may include a scripting module configured to create a script. The traffic generator may execute the script to send and/or receive network messages within the networking system, which may help test one or more components of the networking system. The script may include one or more entries. An entry may be configured to instruct the traffic generator to send one or more network messages.

16 Claims, 6 Drawing Sheets

SYSTEMS AND METHODS FOR GENERATING NETWORK MESSAGES

This application claims priority to, and the benefit of, U.S. provisional patent application 60/683,402, filed May 19, 2005, the disclosure of which is incorporated by reference.

BACKGROUND OF THE INVENTION

1. Field of the Invention

The present invention generally relates to generating network messages and in particular to customizing protocol handshaking.

2. Background Technology

Transferring data is a common function performed by computers and between computers in a network. To achieve the transfer of data, the communicating computers or devices typically follow some type of protocol. One of the protocols used in computers today is Serial Advanced Technology Attachment (SATA). SATA is a serial protocol that enables the rapid transfer of data using thinner cables. SATA is often frequently used, for example, to transfer data to a disk drive and/or from a disk drive.

In order for devices to communicate using a protocol, it is desirable to ensure that the devices comply with most the requirements of the protocol. In fact, when a host is communicating with a device, successful communication typically only occurs when both the host and the device comply with the requirements of the protocol. There are many situations where is it useful to examine how a device responds to a protocol or to monitor a bus to determine what is being transmitted as the host and device communicate using the protocol. In other words, it is often useful to test the protocol itself as well as how the host and/or device respond to the protocol.

One device used to perform such testing is a traffic generator. Traffic generators may be configured to perform different scenarios, typically emulating a host or a device. For example, the traffic generator may be configured to generate traffic (such as, packets, primitives or other network messages), insert the traffic into a data stream, and monitor how the recipient responds to the generated traffic.

In performing these different scenarios, it may be desirable for the traffic generator to comply with a particular protocol in some instances and not comply with the protocol in other instances. For example, it may be desirable for the traffic generator to comply with a particular protocol when testing how well a recipient responds to protocol-compliant traffic. Also, for example, it may be desirable for the traffic generator not to comply with a particular protocol to discover how a recipient responds to non-compliant traffic.

However, ensuring that the traffic generator complies with a protocol, when desired, may be difficult. In particular, traffic generators may use scripts to perform different scenarios, and the time required to process such scripts may make it difficult to comply with the protocol. For example, the traffic generator may not be able to process the script fast enough to comply with the protocol. In addition, creating the scripts may be a time consuming process for a user of the traffic generator.

BRIEF SUMMARY OF EMBODIMENTS OF THE INVENTION

A need therefore exists for a traffic generator that eliminates or reduces the disadvantages and problems listed above and/or other disadvantages and problems.

One aspect is a traffic generator that may comprise a PCI card and a software program. The software program may be configured to receive a user selection identifying a first primitive. The software program may also be configured to create a script entry, the script entry being configured to instruct the PCI card to send a first sequence of primitives, the first sequence of primitives comprising a second primitive preceded by at least one of the first primitive, the second primitive being configured to imply that the first primitive is repeated until another primitive is received.

Another aspect is a networking system that may comprise a traffic generator. The traffic generator may comprise a scripting module. The scripting module may be configured to receive a user selection identifying a first primitive. The scripting module may also be configured to create a script entry, the script entry being configured to instruct the traffic generator to send a first sequence of primitives, the first sequence of primitives comprising a second primitive preceded by at least one of the first primitive, the second primitive being configured to imply that the first primitive is repeated until another primitive is received.

Yet another aspect is a network diagnostic method. The method may comprise receiving a first user selection identifying a first primitive; and creating a script entry configured to instruct a traffic generator to send a first sequence of primitives, the first sequence of primitives comprising a second primitive preceded by at least one of the first primitive, the second primitive being configured to imply that the first primitive is repeated until another primitive is received.

Still another aspect is a networking system that may comprise a traffic generator. The traffic generator may comprise a scripting module configured to create a script entry. The script entry may be configured to instruct the traffic generator to send a first sequence of network messages. The first sequence of network messages may comprise a first network message adjacent a second network message, and the second network message may be different from the first network message.

For purposes of summarizing, some aspects, advantages, and novel features have been described. Of course, it is to be understood that not necessarily all such aspects, advantages, or features will be embodied in any particular embodiment of the invention. Further, embodiments of the invention may comprise aspects, advantages, or features other than those that have been described. Some aspects, advantages, or features of embodiments of the invention may become more fully apparent from the following description and appended claims or may be learned by the practice of embodiments of the invention as set forth in this disclosure.

BRIEF DESCRIPTION OF THE DRAWINGS

The appended drawings contain figures of preferred embodiments to further clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which.

DETAILED DESCRIPTION OF THE PREFERRED EMBODIMENTS

The present invention is generally directed towards a traffic generator. The principles of the present invention, however, are not limited to traffic generator. It will be understood that, in light of the present disclosure, the traffic generator disclosed herein can be successfully used in connection with other types of network diagnostic components.

Figure 1:
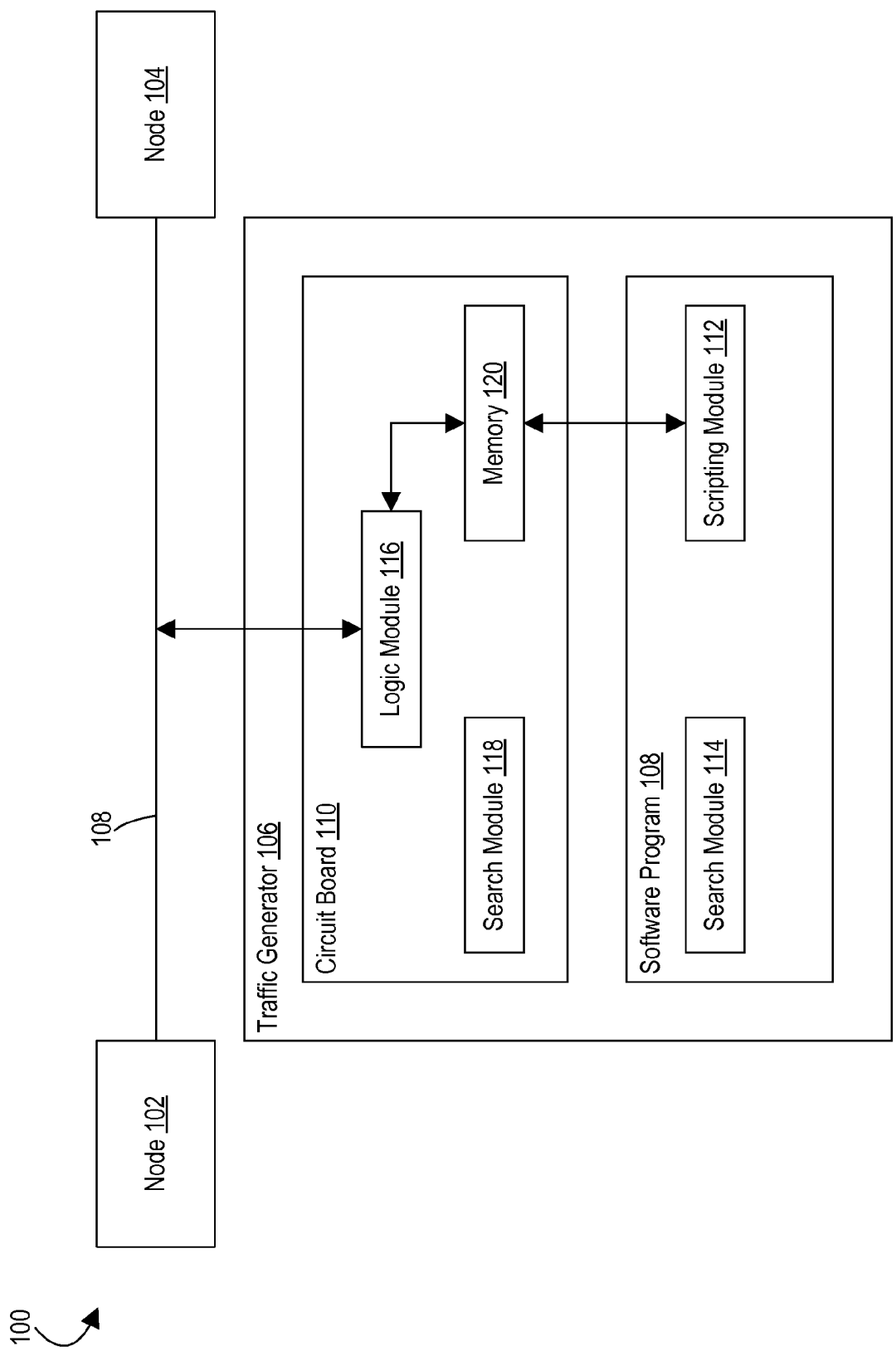
FIG. 1 is a block diagram of an exemplary networking system.

As shown in FIG. 1, a networking system 100 may include one or more nodes, such as nodes 102, 104. As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" includes, but is not limited to, a packet; a datagram; a frame; a data frame; a command frame; an ordered set; a primitive; any unit of data capable of being routed (or otherwise transmitted) through a computer network; and the like. In one embodiment, a network message may comprise transmission characters used for data purposes, protocol management purposes, code violation errors, and the like. Also, a primitive may include, for example, ALIGN, CONT, DMAT, EOF, HOLD, HOLDA, PMACK, PMNAK, PMREQ_S, R_ERR, R_IP, R_OK, R_RDY, SOF, SYNC, WTRM, and X_RDY—such as, those used in certain embodiments of Serial ATA ("SATA"). Of course, any primitives and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like.

As shown in FIG. 1, the networking system 100 may include a network diagnostic component, such as a traffic generator 106. The traffic generator 106 may generate and/or transmit a bit sequence via one or more communication paths or channels, such as a communication path or channel 108. Typically, the bit sequence comprises simulated network traffic including one or more network messages. Advantageously, a network administrator may evaluate how the node 102, the node 104, and/or other nodes in the networking system 100 respond to the simulated network traffic. The simulated network traffic may be configured to be protocol-compliant or non-protocol-compliant, if desired.

The traffic generator 106 may include a software program 108 and a circuit board 110. The software program 108 preferably includes a scripting module 112 and a search module 114. The circuit board 110 preferably includes a logic module 116, a search module 118, and memory 120. The circuit board 110 may form part of a PCI card, and the circuit board is preferably configured to communicate with at least one of the nodes 102, 104 by sending and receiving network messages via the communication path 108.

Figure 2:
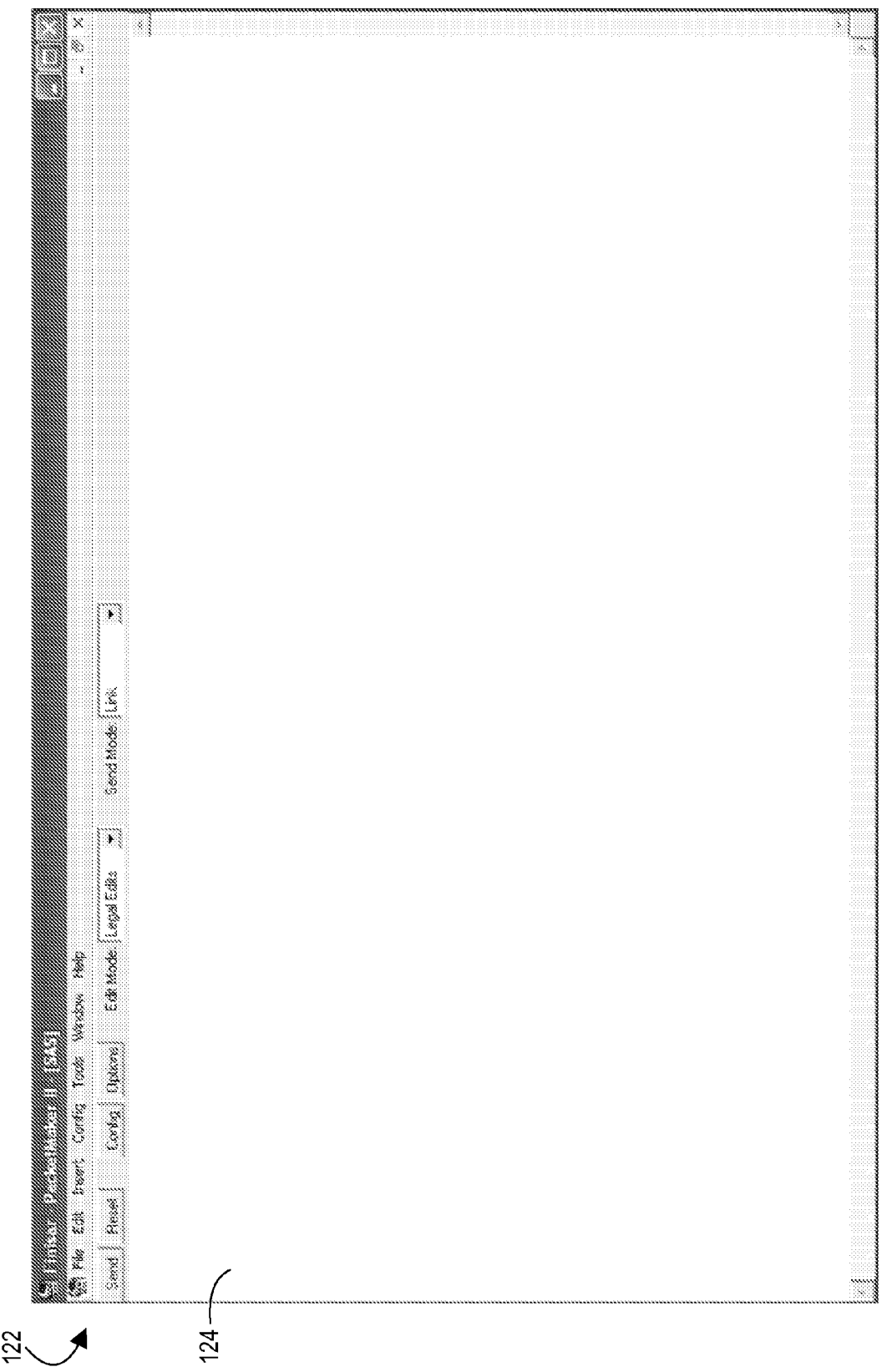
FIG. 2 is a screenshot of an exemplary user interface.

As shown in FIG. 2, the scripting module 112 of the software program 108 may be configured to display a user interface 122 via which a user may create, modify, and display one or more scripts. In particular, the user interface 122 may include a script display area 124 that may be used to create, modify and display a script, such as a script 126 (FIG. 3) or a script 128 (FIG. 4). Advantageously, the traffic generator 106 may execute such scripts to send and/or receive network messages via the communication path 108 to test the nodes 102, 104 and/or other components of the network system 100.

Scripts may include one or more entries. For example, the script 126 may include entries 130, 132, 134, 136, 138, 140, 142, 144; and the script 128 may include entries 146, 148, 150, 152, 154, 156. Some of the entries in a script may be "send" entries, which advantageously instruct the traffic generator 106 to send at least one particular network message; and some of the entries in a script may be "wait-for" entries, which advantageously instruct the traffic generator to wait for the traffic generator to receive at least one particular network message. For example, the entries 132, 136, 140, 144, 146, 150, 150 are exemplary send entries, and the entries 130, 134, 138, 142, 148, 152, 156 are exemplary wait-for entries. It will be appreciated that the scripts may include other entries, if desired. Exemplary features of scripts, script entries, and traffic generators are disclosed in *Packet Maker II User's Manual* (January 2006), which is incorporated by reference and which is available from Finisar Corporation, 1389 Moffett Park Drive, Sunnyvale, Calif. 94089-1133, USA.

Figure 3:
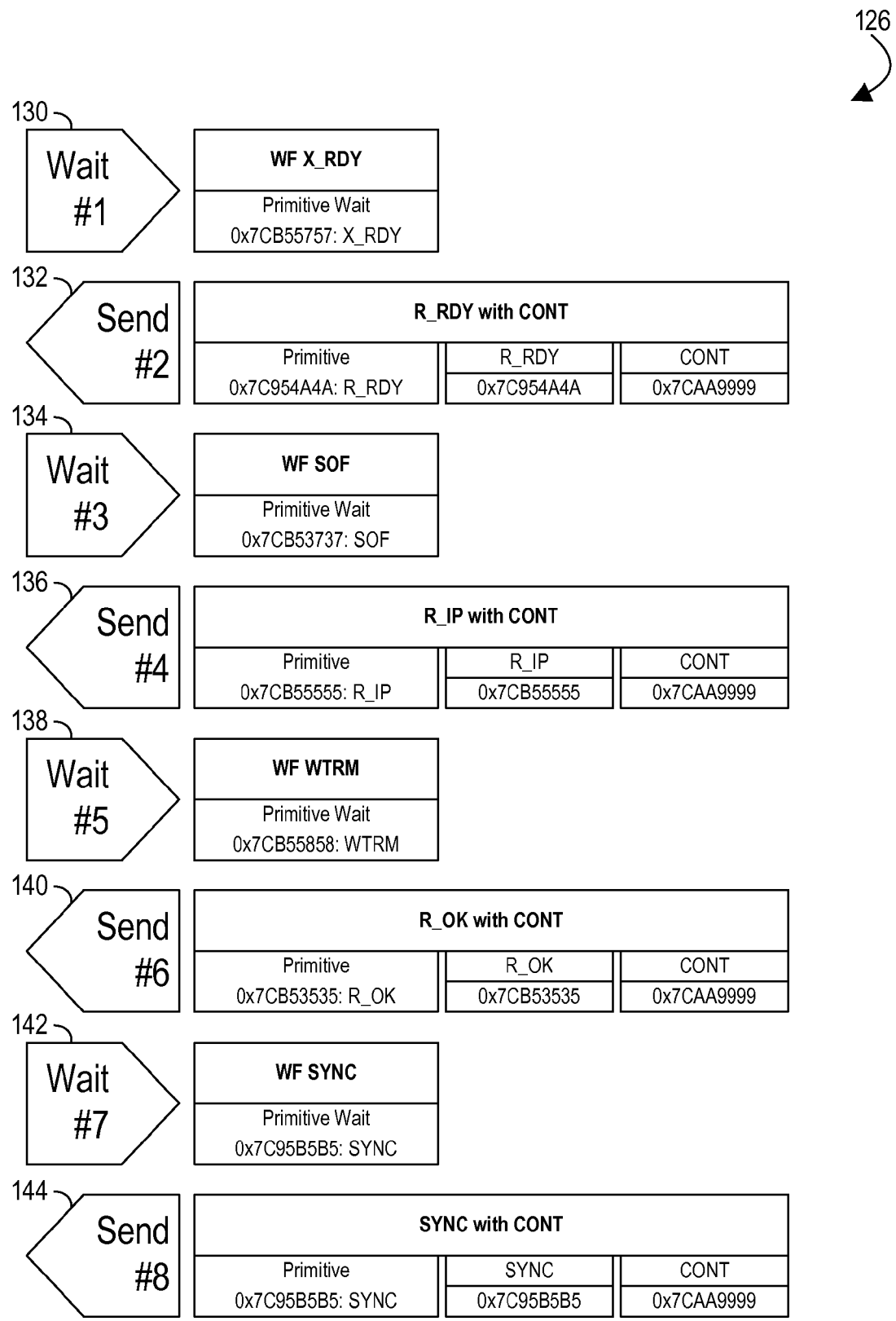
FIG. 3 is a diagram of an exemplary script.
Figure 4:
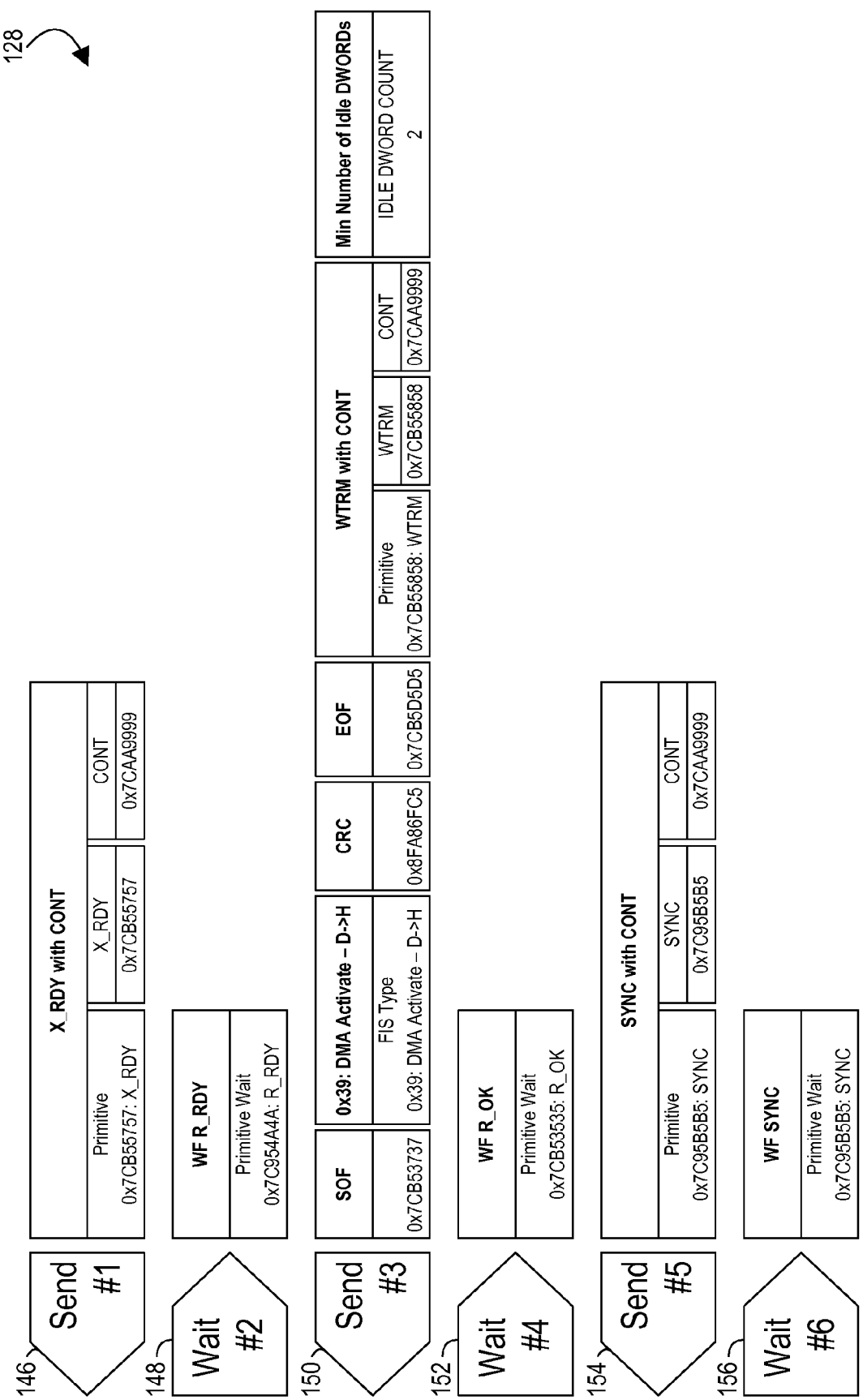
FIG. 4 is a diagram of another exemplary script.
Figure 5:
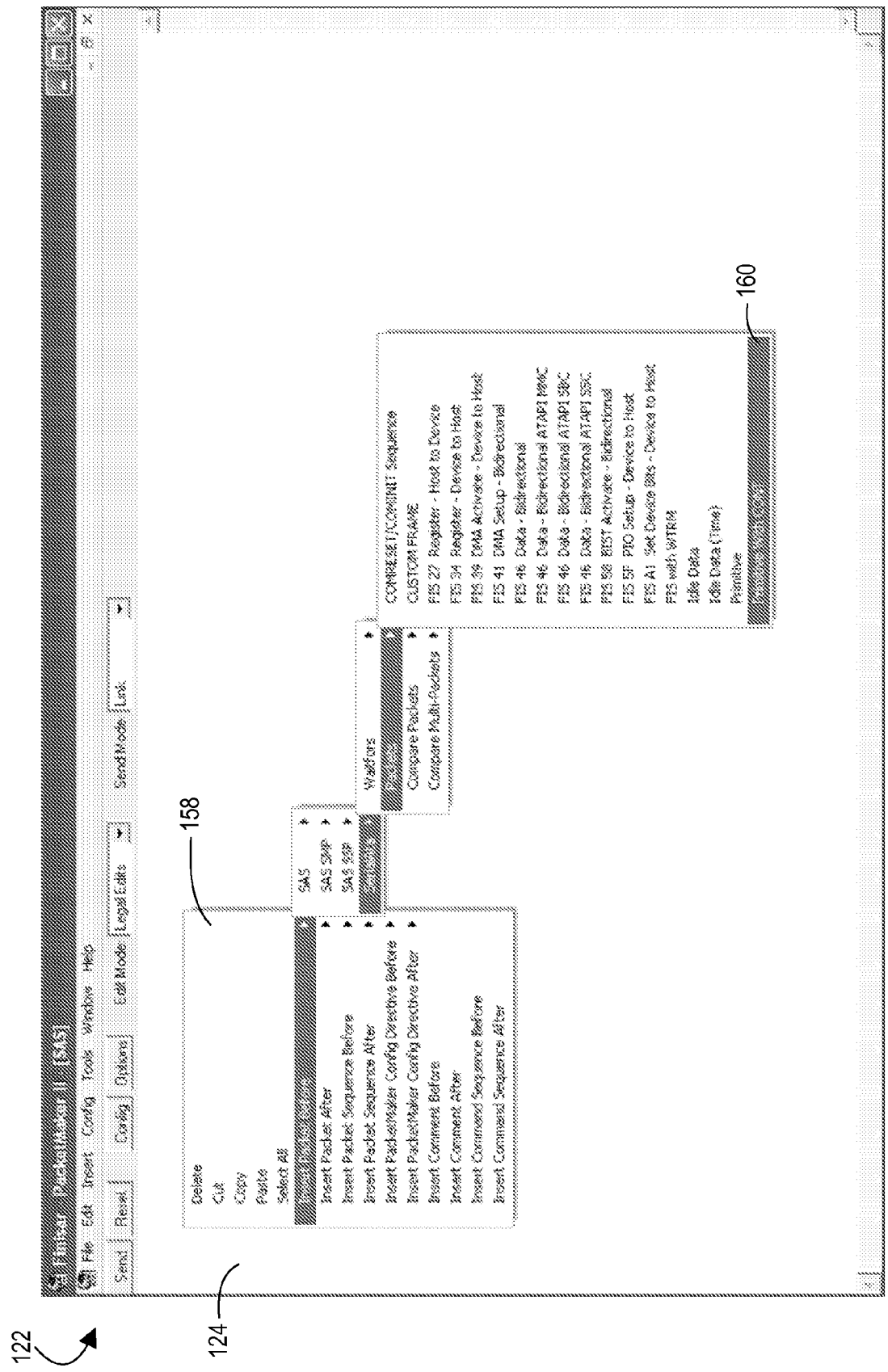
FIG. 5 is a screen shot of the user interface illustrated in FIG. 2, illustrating an exemplary menu.

As shown in FIGS. 3-5, an entry of a script may include a first primitive and a second primitive, and the second primitive may be configured to imply that the first primitive is repeated. The second primitive may advantageously help a traffic generator to comply with certain protocols. In particular, a protocol may require that a primitive be sent repeatedly (without any idle data between the repeatedly sent primitive) until an appropriate response is received. Unfortunately, some traffic generators may not be able to process a script fast enough to repeatedly generate and send the primitives—thus introducing idle data between the primitives and violating the protocol. However, these slower traffic generators may leverage the second primitive to comply with the protocol. In particular, these slower traffic generators may send the second primitive after the first primitive—advantageously allowing the recipient of the second primitive to behave as if it is repeatedly receiving the first primitive in compliance with the protocol. Thus, after sending the second primitive, a traffic generator may send idle data (such as, random or pseudorandom data) until the traffic generator is ready to send another primitive.

In further detail, the CONT primitive in the SATA protocol is configured to imply that a previously received primitive is repeated as long as another primitive is not received. Accordingly, the sender may send idle data, while the recipient of the previously received primitive may (until the recipient receives another primitive from the sender) behave as if the recipient is repeatedly receiving the previously received primitive. In SATA, to help ensure that the particular primitive is received before the CONT primitive is received, the particular primitive is typically sent twice, followed by the CONT primitive. For example, the entry 132 comprises an R_RDY primitive, followed by another R_RDY primitive, followed by CONT primitive. Also, for example, the entry 146 comprises an X_RDY primitive, followed by another X_RDY primitive, followed by a CONT primitive. Further, for example, the entry 150 comprises a WTRM primitive, followed by another WTRM primitive, followed by a CONT primitive. It will be appreciated, however, the particular primitive may be sent merely once prior to the CONT primitive. Thus, an entry of a script may include a first primitive followed by the CONT primitive, or an entry of a script may include two or more of a first primitive followed by the CONT primitive. Of course, an entry of a script need not include multiple primitives or a CONT primitive depending, for example, upon the particular purpose and configuration of the script. Other details regarding SATA are disclosed in *Serial ATA: High Speed Serialized AT Attachment* (Revision 1.0, Aug. 29, 2001), which is incorporated by reference.

In one embodiment, an entry of a script may include a first primitive, a second primitive configured to imply that the first primitive is repeated, and at least one additional network message. For example, as shown in FIG. 4, the entry 150 may include a frame (which may be indicated by the SOF and EOF primitives), and the frame may be followed by a WTRM primitive, followed by another WTRM primitive, followed by a CONT primitive.

Figure 6:
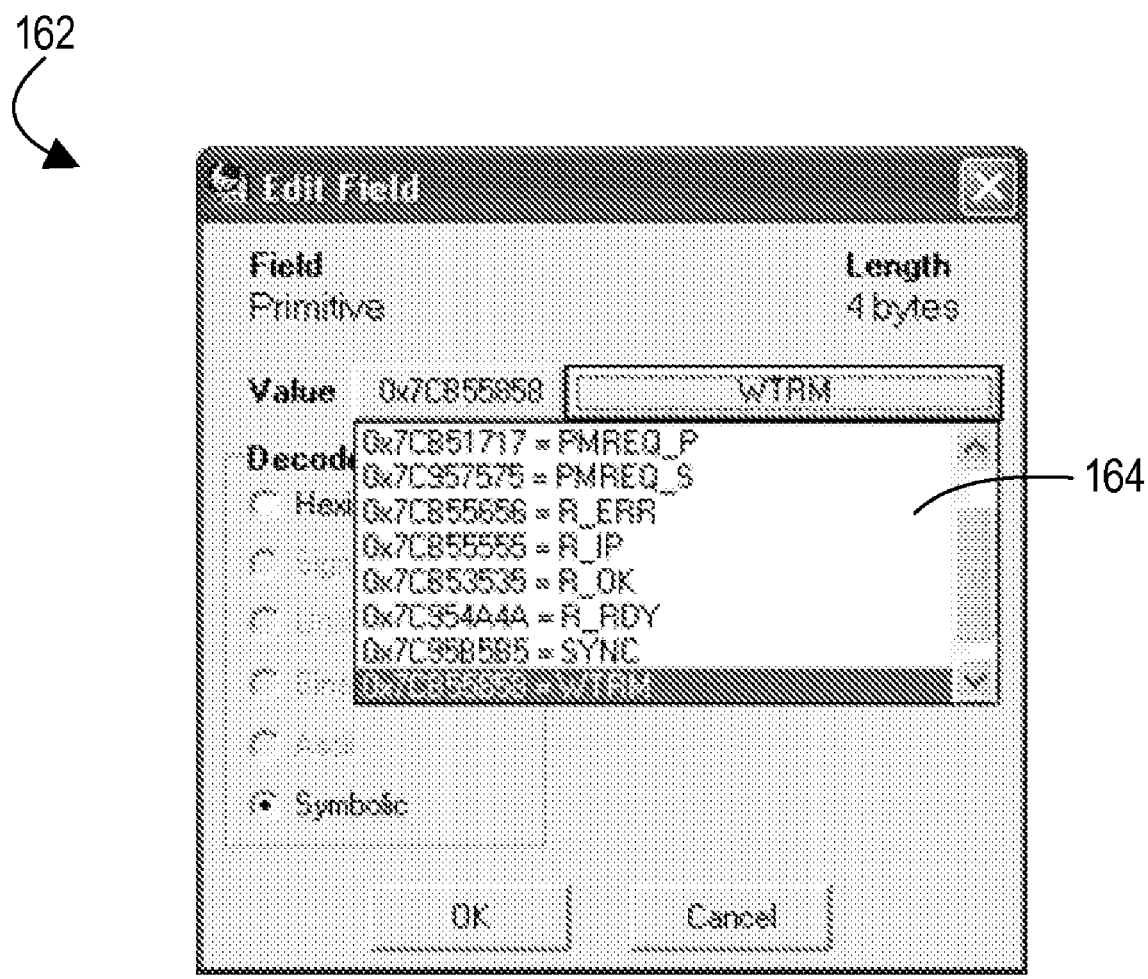
FIG. 6 is a screen shot of another exemplary user interface.

As shown in FIG. 5, the user interface 122 may include one or more menus 158, which may include one or more menu items that a user may select to create, modify, and/or delete one or more entries of a script. For example, the menu 158 may include a menu item 160. The menu item 160 may be selected to open a user interface 162 (FIG. 6), which is preferably configured to receive a user selection of a primitive. In particular, the user interface 162 may include a user interface element 164 configured to receive the user selection of the primitive.

In one embodiment, in response to the user selection of the primitive via the user interface 162, the scripting module 112 may add (to the script in the display area 124) a sequence of entries comprising at least one of a first entry followed by a second entry. The first entry may be configured to instruct the traffic generator 106 to send the selected primitive. The second entry may be configured to instruct the traffic generator 106 to send the CONT primitive.

In another embodiment, in response to the user selection of the primitive via the user interface 162, the scripting module 112 may add (to the script in the display area 124) a single entry configured to instruct the traffic generator 106 to send a sequence of primitives that includes at least one of the selected primitive followed by the CONT primitive. If desired, the selected primitive in the entry may be changed. In particular, the user interface 162 may be reopened (for example, by double-clicking on the entry displayed in the display area 124) and a new primitive may be selected via the user interface 162. In response to the user selection of the newly selected primitive via the user interface 162, the scripting module 112 may configure the entry to instruct the traffic generator 106 to send a sequence of primitives that includes at least one of the newly selected primitive followed by the CONT primitive. By adding and/or updating a single entry that instructs the traffic generator 106 to send the sequence of primitives, the script may be more quickly created and/or updated. In addition, by leveraging the CONT primitive, the traffic generator 106 may more easily comply with the Serial ATA protocol by obviating the need to repeatedly send a particular primitive.

In one embodiment, in response to a user selection received via a user interface, the scripting module 112 may add (to the script in the display area 124) a single entry configured to instruct the traffic generator 106 to send a sequence that includes at least one network message (such as a frame), followed by at least one first primitive, followed a second primitive configured to imply that the first primitive is repeated.

In one embodiment, in response to a user selection of a handshaking primitive received via a user interface, the scripting module 112 may add (to the script in the display area 124) an entry configured to instruct the traffic generator 106 to send the handshaking primitive. In further detail, primitives may be transmitted in response to receipt of other primitives in order to acknowledge that receipt. For example, the HOLDA primitive is preferably transmitted in response to the receipt of HOLD primitives and R_OK or R_ERR is preferably transmitted in response to WTRM primitives. Consequently, the user selection of a receipt-response primitive via the user interface 162 may advantageously allow a user to create scripts customized to the particular handshaking scenarios, which scenarios may or may not comply with the particular protocol.

In one situation, a user may not want to script handshaking, but in another situation, the user may want to script handshaking. Advantageously, the traffic generator 106 may be configured to accommodate both situations. For example, the traffic generator 106 may advantageously be configured not to automatically send or wait for any handshaking primitives. This may allow a user to provide highly customized scripts for handshaking when desired. Also, for example, the traffic generator 106 may be configured to automatically send and wait for handshaking primitives, which may allow a user to more quickly create a script. In this second example, the traffic generator 106 preferably has a default configuration in which the traffic generator 106 automatically sends and waits for handshaking primitives in a protocol-compliant manner; but this default behavior may be modified using a modify-behavior script entry that alters at least a portion of the handshaking. Accordingly, one or more modify-behavior script entries may be used to test particular aspects of handshaking. In one embodiment, a modify-behavior script entry may configure the traffic generator to not send a particular type of handshaking primitive that the traffic generator would have automatically sent in order to comply with the protocol. In one embodiment, a modify-behavior script entry may configure the traffic generator to send a particular type of handshaking primitive in place of another type of handshaking primitive that the traffic generator would have automatically sent in order to comply with the protocol. If desired, a modify-behavior script entry may modify the automatic handshaking in some other fashion. Further, a modify-behavior script entry may modify behavior other than handshaking, if desired.

In one embodiment, the scripting module 112 may create (in the script in the display area 124) a single entry configured to instruct the traffic generator 106 to send a sequence that includes at least one network message (such as a frame) and at least one primitive, such as a handshaking primitive. If desired, the single entry may be configured to instruct the traffic generator 106 to send a sequence that includes at least one network message followed by at least one handshaking primitive (such as, a WTRM primitive). For example, as shown in FIG. 4, the entry 150 comprises a frame (which may include a SOF primitive, a payload, a CRC, and an EOF primitive) and a WTRM primitive. In particular, the entry 150 comprises the frame, followed by a first WTRM primitive, a second WTRM primitive, and a CONT primitive. If desired, the single entry may be configured to instruct the traffic generator 106 to send a sequence that includes at least one handshaking primitive followed by at least one network message.

In one embodiment, the scripting module 112 may create (in the script in the display area 124) a single entry configured to instruct the traffic generator 106 to send a sequence that includes a first network message adjacent a network message. The first and second network messages may be different. For example, the entry 150 comprises a WTRM primitive adjacent a CONT primitive. Also, for example, the entry 150 comprises a frame adjacent a WTRM primitive. However, the first and second network messages may be the same. For example, the entry 150 comprises a first WTRM primitive adjacent a second WTRM primitive.

As mentioned above, the scripting module 112 may be used to create a script, which the traffic generator 106 may execute in order to send and/or receive network messages. In further detail, the software program 108 may load instructions corresponding to the script into the memory 120 and may trigger the logic module 116 to begin executing those instructions in the memory 120. In some instances, an instruction may indicate that the logic module 116 should wait for the receipt of a particular network message before proceeding to the next instruction. For example, the instruction may indicate that the logic module should wait for a search module to determine that the particular network message has been received. In some instances, waiting for a primitive may be more efficiently implemented using a hardware-based search module, while waiting for a frame may be more efficiently implemented using a software-based search module. It will be appreciated, however, that a search module may be implemented in hardware (such as a search module 118) and/or in software (such as a search module 114), if desired.

As mentioned above, a single script entry may include various combinations of network messages. By combining these network messages into a single script entry, the traffic generator 106 may more quickly transmit the network messages, which may help prevent (or reduce the chances of) the traffic generator 106 unintentionally introducing idle data. For example, in some embodiments, the traffic generator 106 may be configured to execute one script entry at a time, and combining the network messages into a single script entry may help the traffic generator 106 to more quickly execute the script to prevent (or reduce the chances of) unintentionally introducing idle data. It will be appreciated, however, that the traffic generator 106 need not execute one script entry at a time and may execute the script in other suitable fashions.

Exemplary Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network testing device comprising: a traffic generator for generating complying traffic, which complies with a protocol of the network, and for generating non-complying traffic, which does not comply with the protocol of the network, wherein the traffic generator not able to process a script fast enough to comply with the network protocol, wherein the traffic generator comprises:

a PCI card; and a software program configured to receive a user selection identifying a first primitive and to create a script entry via a user interface that comprises one or more menus configured for receiving user input for modifying, creating, or displaying the script entry, the user interface including a script display area, at least one menu for receiving the user selection for identifying the first primitive, the script entry being configured to instruct the PCI card to send a first sequence of primitives, the first sequence of primitives comprising a second primitive preceded by at least one of the first primitive, the second primitive being configured to imply that the first primitive is repeated until another primitive is received to eliminate idle data between the primitives;

wherein the traffic generator is placed in-line between two nodes of a network for inserting the complying and non-complying traffic into a data stream between the two nodes, and for monitoring how at least one of the nodes responds to the complying and non-complying traffic; and wherein the software program is further configured to receive a user selection identifying a third primitive and to update the script entry, the updated script entry being configured to instruct the PCI card to send a second sequence of primitives, the second sequence of primitives comprising the second primitive preceded by at least one of the third primitive, the second primitive being configured to imply that the third primitive is repeated until another primitive is received.

2. The traffic generator as in claim 1, wherein the first sequence of primitives comprises the first primitive preceded by at least two of the second primitive.

3. The traffic generator as in claim 1, wherein the first, second, and third primitives are compatible with Serial ATA and wherein the second primitive is a CONT primitive.

4. The traffic generator as in claim 1, wherein the PCI card is configured to send idle data after sending the first sequence of primitives; and wherein the idle data is pseudorandom data.

5. The traffic generator as in claim 1, wherein the PCI card is configured to send idle data after sending the first sequence of primitives; and wherein the idle data is random data.

6. A network testing device comprising:

a traffic generator for generating complying traffic, which complies with a protocol of the network, and for generating non-complying traffic, which does not comply with the protocol of the network, wherein the traffic generator is not able to process a script fast enough to comply with the network protocol, the traffic generator comprising:

a scripting module configured to receive a user selection identifying a first primitive and to create a script entry via a user interface that comprises one or more menus configured for receiving user input for modifying, creating, or displaying the script entry, the user interface including a script display area, at least one menu for receiving the user selection for identifying the first primitive, the script entry being configured to instruct the traffic generator to send a first sequence of primitives, the first sequence of primitives comprising a second primitive preceded by at least one of the first primitive, the second primitive being configured to imply that the first primitive is repeated until another primitive is received to eliminate idle data between the primitives;

wherein the traffic generator is placed in-line between two nodes of the network system for inserting the complying and non-complying traffic into a data stream between the two nodes, and for monitoring how at least one of the nodes responds to the complying and non-complying traffic; and wherein the scripting module is further configured to receive a user selection identifying a third primitive and to update the script entry, the updated script entry being configured to instruct the traffic generator to send a second sequence of primitives, the second sequence of primitives comprising the second primitive preceded by at least one of the third primitive, the second primitive being configured to imply that the third primitive is repeated until another primitive is received.

7. The networking system as in claim 6, wherein the first sequence of primitives comprises the first primitive preceded by at least two of the second primitive.

8. The network diagnostic method as in claim 7, further comprising:

sending the first sequence of primitives; and sending idle data after sending the first sequence of primitives; wherein the idle data is pseudorandom data.

9. The networking system as in claim 6, wherein the first, second, and third primitives are compatible with Serial ATA and wherein the second primitive is a CONT primitive.

10. The networking system as in claim 6, further comprising a node configured to receive the sequence of primitives from the traffic generator.

11. The networking system as in claim 6, wherein the traffic generator is configured to send idle data after sending the first sequence of primitives; and wherein the idle data is pseudorandom data.

12. The networking system as in claim 6, wherein the traffic generator is configured to send idle data after sending the first sequence of primitives; and wherein the idle data is random data.

13. A network diagnostic method comprising:

receiving a first user selection identifying a first primitive via a user interface that comprises one or more menus configured for receiving user input for modifying, creating, or displaying a script entry, the user interface including a script display area, at least one menu for receiving the user selection for identifying the first primitive;

creating the script entry for a test script, which is not fast enough for a network protocol, thereby causing idle data, configured to instruct a traffic generator, which generates complying traffic that complies with a protocol of the network and generates non-complying traffic that does not comply with the protocol of the network, to send a first sequence of primitives, the first sequence of primitives comprising a second primitive preceded by at least one of the first primitive, the second primitive being configured to imply that the first primitive is repeated until another primitive is received to eliminate idle data between the primitives;

receiving a second user selection identifying a third primitive; and configuring the script entry to instruct the traffic generator to send a second sequence of primitives, the second sequence of primitives comprising the second primitive preceded by at least one of the third primitive, the second primitive being configured to imply that the third primitive is repeated until another primitive is received;

wherein the traffic generator is placed in-line between two nodes of a network for inserting complying and non-complying traffic into a data stream between the two nodes, and for monitoring how at least one of the nodes responds to the complying and non-complying traffic.

14. The network diagnostic method as in claim 13, wherein the first sequence of primitives comprises the first primitive preceded by at least two of the second primitive.

15. The network diagnostic method as in claim 13, wherein the first, second, and third primitives are compatible with Serial ATA and wherein the second primitive is a CONT primitive.

16. The network diagnostic method as in claim 13, further comprising:
 sending the first sequence of primitives; and
 sending idle data after sending the first sequence of primitives; wherein the idle data is random data.

* * * * *